(12) United States Patent
Chan (10) Patent No.: US 8,954,606 B2
(45) Date of Patent: Feb. 10, 2015

(54) SYNCHRONIZATION BETWEEN A MOBILE DEVICE AND A COMPUTING TERMINAL

(75) Inventor: Edward Chun Kei Chan, Waterloo (CA)

(73) Assignee: BlackBerry Limited, Waterloo (CA)

( * ) Notice: Subject to any disclaimer, the term of this patent is extended or adjusted under 35 U.S.C. 154(b) by 802 days.

(21) Appl. No.: 12/508,813

(22) Filed: Jul. 24, 2009

(65) Prior Publication Data

US 2010/0241763 A1    Sep. 23, 2010

Related U.S. Application Data

(60) Provisional application No. 61/161,870, filed on Mar. 20, 2009.

(51) Int. Cl.
*G06F 15/16* (2006.01)
*H04L 29/08* (2006.01)

(52) U.S. Cl.
CPC ........ *H04L 67/1095* (2013.01); *H04L 67/2857* (2013.01)
USPC .......................................... 709/248; 709/249

(58) Field of Classification Search
USPC .................. 709/248–249; 715/740; 370/503; 340/1.1–16.1
See application file for complete search history.

(56) References Cited

U.S. PATENT DOCUMENTS

| | | | |
|---|---|---|---|
| 7,360,152 B2 | 4/2008 | Capps et al. | |
| 2003/0046433 A1 | 3/2003 | Luzzatti et al. | |
| 2003/0146932 A1 | 8/2003 | Weng et al. | |
| 2005/0038819 A1 | 2/2005 | Hicken et al. | |
| 2005/0216855 A1 | 9/2005 | Kopra et al. | |
| 2005/0240494 A1 | 10/2005 | Cue et al. | |
| 2006/0106881 A1 * | 5/2006 | Leung et al. | 707/200 |
| 2006/0195462 A1 | 8/2006 | Rogers | |
| 2006/0200596 A1 * | 9/2006 | So | 710/38 |
| 2007/0179989 A1 * | 8/2007 | Maes | 707/201 |
| 2007/0260751 A1 * | 11/2007 | Meesseman | 709/248 |
| 2008/0167066 A1 * | 7/2008 | Yoon et al. | 455/550.1 |
| 2008/0168245 A1 | 7/2008 | De Atley et al. | |
| 2008/0189390 A1 | 8/2008 | Heller et al. | |
| 2008/0244415 A1 * | 10/2008 | Shim | 715/740 |
| 2009/0063660 A1 | 3/2009 | Fleischman et al. | |

(Continued)

FOREIGN PATENT DOCUMENTS

| | | | |
|---|---|---|---|
| EP | 1367800 A | 12/2003 | |
| EP | 1515340 A | 3/2005 | |
| WO | 01/45346 A | 6/2001 | |

OTHER PUBLICATIONS

European Patent Application No. 09166346.8 Search Report dated Dec. 22, 2009.

(Continued)

*Primary Examiner* — Umar Cheema
(74) *Attorney, Agent, or Firm* — Perry + Currier Inc.; Kristjan Spence (57) ABSTRACT

A method of synchronizing a mobile device with a computing terminal, comprising in a first stage, synchronizing between a server and one of the mobile device and the computing terminal, and in a second stage, synchronizing between the server and the other of the mobile device and the computing terminal, wherein the second stage of synchronizing being permissible only upon verification of an identifier associated with content selected for transfer during the first stage of synchronizing.

22 Claims, 6 Drawing Sheets

(56) References Cited

U.S. PATENT DOCUMENTS

2009/0247134 A1* 10/2009 Jeide et al. ................ 455/414.2
2009/0282020 A1    11/2009 McSheffrey et al.

OTHER PUBLICATIONS

European Patent Application No. 09163942.7 Search Report dated Aug. 11, 2009.
Ask Dave Taylor downloaded from http://www.askdavetaylor.com/copy_itunes_music_onto_apple_iphone.html.
Tom's Guide downloaded from http://www.tomsguide.com/us/Apple-iPhone-patent,news-2277.html.
Mashable/The Social Media Guide downloaded from: ttp://mashable.com/2007/06/06/nutsie/.
What's nuTsie?—nuTsie.com downloaded from http://www.nutsie.com/main/whats_nutsie.
What is Steam downloaded from http://store.steampowered.com/about/.
Stream (content delivery)—Wikipedia, the free encyclopedia, downloaded from en.wikipedia.org/wiki/Steam_(content_delivery).
SuperSync, downloaded from www.supersync.com/.
SuperSync 2.2, personal music library synchronization—UGN, downloaded from www.user-groups.net/shareware/SuperSync.html.
nuTsie Source: Melodeo, Inc., downloaded from www.marketwire.com/press-release/Melodeo-Inc-853184.html.
nuTsie Source: Melodeo, Inc., downloaded from www.marketwire.com/press-release/Melodeo-Inc-889602.html.
Impulse Driven: About Impulse, downloaded from http://www.impulsedriven.com/about.aspx.
Impulse—Wikipedia, the free encyclopedia, downloaded from http://en.wikipedia.org/wiki/Impulse_(content_delivery).

* cited by examiner

Figure 6

SYNCHRONIZATION BETWEEN A MOBILE DEVICE AND A COMPUTING TERMINAL

CROSS REFERENCE TO RELATED APPLICATION

The present specification claims priority from U.S. Provisional Patent Application No. 61/161,870, filed Mar. 20, 2009. Its contents are incorporated herein by reference.

FIELD

The present application relates generally to portable communication devices, and specifically to a system and method for synchronizing a mobile device and a computing terminal through a server.

BACKGROUND

In the field of mobile devices, the synchronization of files with a computing terminal on which desired content (e.g. files) is located is generally limited to communications established between these electronic endpoints. Unfortunately, bandwidth restrictions and available connectivity often limit this communication, thereby rendering the communication as insufficient to transfer desired content. In addition, existing systems to facilitate the synchronization of files is restricted to the aforementioned end points, namely the mobile device and the computing terminal. With increasing electronic devices available to consumers, the limited connectivity available for synchronization can be excessively limiting.

BRIEF DESCRIPTION OF THE DRAWINGS

Embodiments are described with reference to the following figures, in which.

DETAILED DESCRIPTION OF THE EMBODIMENTS

In general, provided is a method of synchronizing through an intermediary server.

According to a first aspect, there is provided a method of synchronizing a mobile device with a computing terminal via a server, the mobile device comprising a communication interface and a memory, the method comprising transmitting a first instruction, being an instruction to transmit content from the computing terminal to a server, from the communication interface to the computing terminal; transmitting a second instruction, being an instruction to transmit the content from the server to the mobile device, from the communication interface to the server; and receiving the content from the computing terminal at the communication interface and storing the content in the memory.

According to a second aspect, there is provided a method of synchronizing a computing terminal with a mobile device via a server, the computing terminal comprising a communication interface and a memory, the method comprising storing content in the memory; receiving a first instruction at the communication interface to transmit content from the memory to a server; selecting an identifier for association with the content; and responsive to the first instruction, transmitting the content and the identifier from the communication interface to the mobile device.

According to a third aspect, there is provided a method of synchronizing a computing terminal with a mobile device via a server, the server comprising a memory and a communication interface, the method comprising receiving content at the communication interface from one of the computing terminal and the mobile device; storing the content in the memory in association with a first identifier; receiving at the communication interface an instruction to transmit the content to the other of the computing terminal and the mobile device, the instruction comprising a second identifier; upon verification that the second identifier matches the first identifier, transmitting the content to the other of the computing terminal and the mobile device.

According to a fourth aspect, there may be provided a method of synchronizing a mobile device with a computing terminal, the method comprising in a first stage, synchronizing between a server and one of the mobile device and the computing terminal; and in a second stage, synchronizing between the server and the other of the mobile device and the computing terminal; wherein the second stage of synchronizing being permissible only upon verification of an identifier associated with content selected for transfer during the first stage of synchronizing.

According to a fifth aspect provided is a method of synchronizing content between a computing terminal and a selected destination, the method comprising in a first stage, synchronizing between a server and the computing terminal; and in a second stage, synchronizing between the server and a selected destination; wherein the second stage of synchronizing being permissible only upon verification of an identifier associated with content selected for transfer during the first stage of synchronizing.

Figure 1:
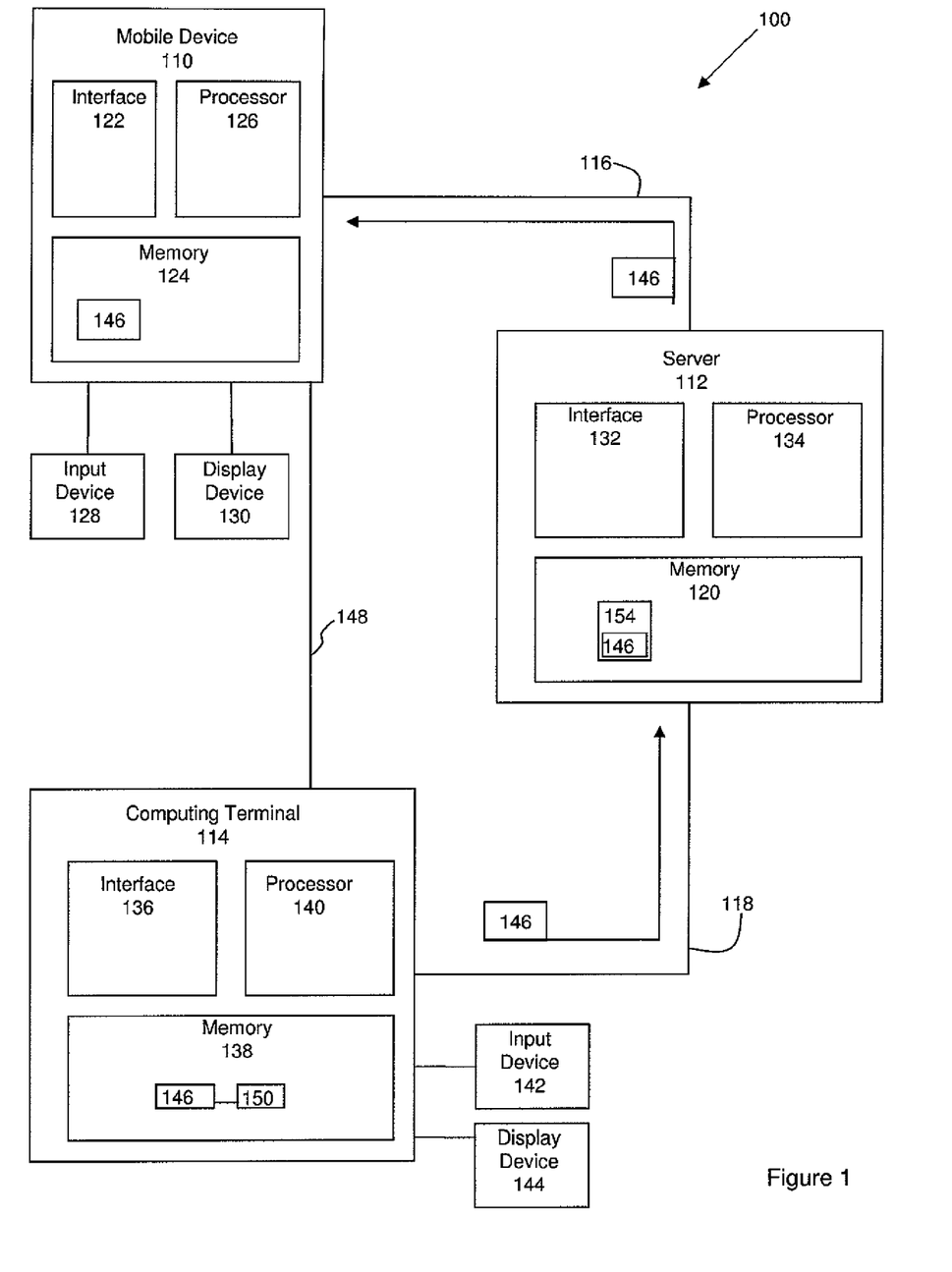
FIG. 1 depicts a system for synchronizing a mobile device and a computing terminal, according to a non-limiting embodiment.

FIG. 1 depicts a system 100 for synchronizing a database (e.g. a multimedia library) between a mobile device 110 and a computing terminal 114, according to non-limiting embodiments. System 100 generally comprises mobile device 110, a server 112 and computing terminal 114. Mobile device 110 and server 112 are in communication via a link 116. Similarly, server 112 and computing terminal 114 are in communication via a link 118. Links 116, 118 can be wired or wireless as desired; links 116, 118 can further comprise any suitable communication network (such as a LAN, WiFi network, etc). In general, server 112 is enabled to perform as a remote storage location; that is server 112 provides a memory 120 for storage, such as for storing data files and synchronization instructions. A method of synchronization based on system 100 is broadly divided into two synchronization stages, the first stage being the synchronization between computing terminal 114 and server 112, and the second stage being the synchronization between server 112 and mobile device 110. In other embodiments, the first synchronization stage can be the synchronization between server 112 and mobile device 110, while the second synchronization stage can be the synchronization between computing terminal 114 and server 112.

Mobile device 110 generally comprises any suitable mobile communication/computing device, including but not limited to a laptop computer, a personal digital assistant (PDA), a cell/mobile phone, and the like, or a combination of such.

Mobile device 110 comprises a communication interface 122 enabled to communicate with server 112, interface 122 being generally compatible with link 116. That is, if link 116 comprises a wireless link, interface 122 is enabled to communicate wirelessly, using any suitable wireless protocol. If link 116 comprises a wired link, then interface 122 is enabled to communicate via a wired link, using any suitable wired protocol.

Mobile device 110 further comprises a memory 124 for storing data files and the like. Memory 124 can comprise any suitable memory device, including but not limited to random access memory (RAM), removable memory, memory cards, hard disks, and the like.

Mobile device 110 further comprises a processor 126 in communication with interface 122 and memory 124, for example via a suitable computer bus (not depicted). Processor 126 is generally enabled to process data transmitted between mobile device 110 and server 112.

Mobile device 110 can also include or be in communication with any suitable input device 128, or combination of input devices. Input device 128 is generally enabled to receive input data, and can comprise any desired combination of suitable input devices, including but not limited to a keyboard/keypad, a pointing device, a mouse, a trackball, a touchpad, a touch screen and the like.

Mobile device 110 can also include or be in communication with any suitable display device 130. Display device 130 can include, but is not limited to, a flat panel display (e.g. a liquid crystal display (LCD), organic light-emitting diode (OLED) display, plasma display, and the like), a cathode ray tube (CRT), a computer monitor, and the like. Display device 130 comprises circuitry for generating a representation of data files. Display device 130 can include any suitable combination of CRT or flat panel displays (e.g. plasma and the like), and circuitry can include any suitable combination of circuitry for controlling the displays, including but not limited to display buffers, transistors, electron beam controllers, LCD cells, plasma cells, phosphors, etc. In particular, display device 130 and circuitry can be controlled by processor 126 to generate representation of files contained within memory 124. Since the mobile device 110 is generally intended to be mobile, implementation of specific input and display devices can take into account the level of mobility being designed for.

Server 112 generally comprises a computing device for managing data files. Sewer 112 comprises an interface 132 which can be similar to interface 122, interface 132 generally compatible with links 116, 118. Server 112 further comprises a memory 120 which can be similar to memory 124, as described above. Server 112 further comprises a processor 134 for managing data files.

Computing terminal 114 comprises a computing device suitable for managing data files. Computing terminal 114 comprises an interface 136 which can be similar to interface 132, interface 136 generally compatible with link 118. Computing terminal 114 further comprises a memory 138 which can be similar to memory 120, as described above. Computing terminal 114 further comprises a processor 140 for managing data files.

Computing terminal 114 can also be in communication with any suitable input device 142 which can be similar to input device 128. Computing terminal 114 can also be in communication with any suitable display device 144 which can be similar to display device 130.

Figure 2:
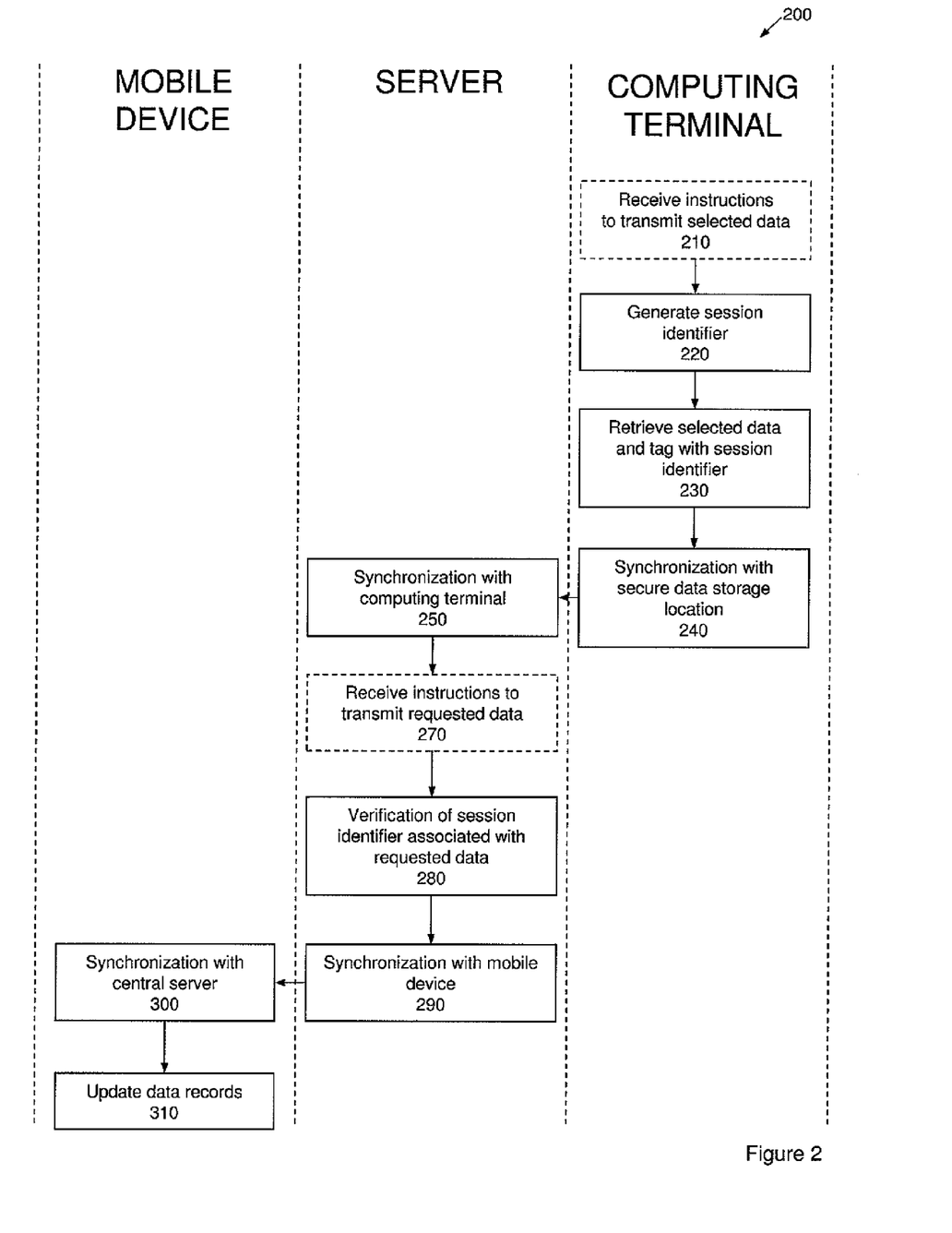
FIG. 2 depicts a method of synchronizing a mobile device and a computing terminal, according to a non-limiting embodiment.

Attention is now directed to FIG. 2 which depicts a method 200 for synchronizing a mobile device and a computing terminal. In order to assist in the explanation of the method, it will be assumed that the method is performed using the system depicted in FIG. 1. Furthermore, the following discussion of the method will lead to a further understanding of the system and its various components. However, it is to be understood that the system and/or the method can be varied, and need not work exactly as discussed herein in conjunction with each other, and that such variations are within the scope of present embodiments.

In one embodiment, the synchronization between mobile device 110 and computing terminal 114 initiates at step 210, where through processor 140 of the computing terminal 114, content data, namely one or more files 146 (generically referred to as file 146 and collectively as files 146; e.g. a multi-media file) are selected for transmission to mobile device 110. The synchronization instructions to transmit files 146 may be received at computing terminal 114 through input device 142, or may originate from a remote device (e.g. a mobile device) connected to the computing terminal through a suitable link 148 (e.g. local WiFi, Bluetooth, cellular network, USB cable, etc.). As shown, mobile device 110 in system 100 is enabled to communicate with computing terminal 114 through link 148, but the device providing the synchronization instructions to transmit files 146 need not be the same device to which files 146 will ultimately be delivered. That is, the synchronization instructions to synchronize computing terminal 114 with mobile device 110 may be initiated through a separate device (not shown) that will not be subject to data synchronization. The separate device can be, for example, a mobile device similar to mobile device 110 as described herein or a computing terminal similar to computing terminal 114 as described herein.

In an alternate embodiment, the synchronization instructions to initiate synchronization can be relayed through server 112. In this manner, the server 112 serves to relay/queue synchronization instructions for synchronization originating from mobile device 110 or computing terminal 114. This way, computer terminal 114 does not constantly have to be on, and neither does mobile device 110 have to be in range of service. As such, the synchronization instruction may originate from a remote device (e.g. mobile device 110), with the synchronization instruction being routed through server 112, for example through communication links 116, 118. In one scenario, computer terminal 114 may be turned off and server 112 may queue the synchronization instructions on memory 120, until such time where computer terminal 114 is able to receive and process the synchronization instructions. In another scenario, processor 134 at server 112 may cross-reference synchronization instructions with content already stored at memory 120 of server 112. Where a cross-reference match exists, requested content to be synchronized can be transferred directly from memory 120 at server 112 to mobile device 110, bypassing computer terminal 114 altogether. As such, server 112 may act as a temporary storage location of both content (e.g. files 146) and synchronization instructions originating from either mobile device 110 or computing terminal 114.

System 100 can be enabled to permit selection between an immediate synchronization, and a delayed synchronization in accordance with a preselected schedule based on, for example, time or events/conditions. For example, system 100 may permit for more than one file 146 to be selected, and initiate synchronization to effect transfer of the selected files only upon receipt of a command indicating that the selection of files is complete. The logic enabled with the preselected schedule may be located in any one of or a combination of mobile device 110, server 112 and computing terminal 114. In one embodiment, components in system 100 may be enabled to detect the "on" presence of other components in the system. For example, the server 112 may be enabled to detect the "on" presence of computing terminal 114 and signal/remind that a file transfer was requested and queued at server 112 from mobile device 110.

At step 220, an identifier 150 for association with files 146 is selected by processor 140 of computing terminal 114. Identifier 150 is used to indicate that files 146 are to be restricted to a specific user. Where the user has previously synchronized data using system 100, identifier 150 may already be allocated to the user in question, and therefore will be selected. Where the user has not previously used system 100, a new identifier 150 is generated by processor 140. Identifier 150 may be based on specific user identification information, such as user membership information, or based on the identity of the device (e.g. the mobile device) to which the computing terminal is intended to synchronize with. Computing terminal 114 can be enabled to permit the input of a restricted listing of permissible devices (e.g. a home-based computer and a mobile device) that may synchronize in accordance with the system 100. Various methodologies of user verification and session authentication are known and are contemplated for implementation as appropriate. Upon synchronization between computing terminal 114 and server 112, subsequent requests to synchronize with a farther destination (e.g. mobile device 110) will only be accepted upon receipt of an identifier matching identifier 150. In this way, the data synchronization, and thus the transfer of data is secure and only accessible at server 112 by the user in question. Identifier 150 may be a computationally unique alpha-numeric identifier, distinguishable from identifiers that may have already been received at server 112 in association with data files of other users. For example, identifier 150 can be a string of random characters and/or numerals. Identifier 150 can also, in some embodiments, be serial number of mobile device 110, a name of a user or the like. In other embodiments, identifier 150 can be a hash of any of the previously-mentioned exemplary identifiers.

At step 230, selected file 146 is retrieved from memory 138 of computing terminal 114, and tagged/associated with the aforementioned identifier 150, so as to restrict access to the user initiating the transfer request.

At step 240/250, computing terminal 114 is synchronized with server 112. On synchronization, selected file 146 is transferred from computing terminal 114 to server 112, in particular to a dedicated file storage location 154 allocated to that particular user. Memory 120 of server 112 is enabled to provide one or more dedicated file storage locations 154 (generically referred to as file storage location 154, and collectively as file storage locations 154) that are each restricted to a specific user of system 100. For each dedicated file storage location 154, server 112 provides authenticated session accessibility based on verification of identifier 150. File 146 is communicated from computing terminal 114 to server 112 using communications link 118 and respective interfaces 136, 132. Communication link 118 may comprise any wired or wireless network suitable for the transmission of data. File 146 now located in file storage location 154 is secure and restricted to the user in question through verification of identifier 150.

Server 112 may be located locally, such as within a LAN environment, or may be remote and accessible through a suitable WAN, such as over the Internet. Either way, the first stage in the synchronization between mobile device 110 and computing terminal 114 is the synchronization between computing terminal 114 and server 112. In the above embodiment, file 146 is selected at computing terminal 114, with the synchronization effecting the transfer of selected file 146 to file storage location 154 in memory 120 of server 112.

At step 270, synchronization between server 112 and the final destination of selected file 146, in this case mobile device 110, is initiated. In some embodiments, mobile device 110 transmits a synchronization instruction, this instruction being received by processor 134 of server 112. The synchronization instructions are communicated from mobile device 110 to server 112 using communications link 116 and respective interfaces 122, 132. Communication link 116 may comprise any wired or wireless network suitable for the transmission of data. For example, the communication link may be wired or wireless, as dictated by the specific circumstances and local availability of service. In one non-limiting example, the communication between mobile device 110 and server 112 is through a WiFi enabled internet connection. In some embodiments, the synchronization instruction may be temporarily queued in server 112, for example by using input device 142 on computing terminal 114 to initiate the overall synchronization process. On detecting the presence of an "on" state at mobile device 110, server 112 can proceed with the transfer of content. To ensure the requested synchronization is secure, the synchronization instructions are accompanied by the aforementioned identifier 150.

At step 280, processor 134 of server 112 compares identifier 150 with a listing of identifiers for file storage location 154 provided in memory 120. If processor 134 identifies a match, file storage location 154 is marked for synchronization with mobile device 110 in accordance with preset conditions (e.g. a preselected destination device, such as a home-based computer). If processor 134 fails to identify a match, the request for synchronization ends. In some embodiments, where a match is not found, server 112 will issue a suitable message to indicate that the user is not recognized, and provide further instruction/assistance to the user attempting to access system 100.

At step 290/300, upon authentication of identifier 150, server 112 is synchronized with mobile device 110. At this point, file storage location 154 of server 112 is synchronized with mobile device 110, effecting the transfer of selected file 146 to a suitable file storage location in memory 124 of mobile device 110.

At step 310, mobile device 110 updates the data records and the synchronization process terminates.

As previously indicated, the first stage in the synchronization between mobile device 110 and computing terminal 114 effects the transfer of data between computing terminal 114 and server 112. In the second stage, server 112 is synchronized with mobile device 110, thereby effecting the transfer of data therebetween. The first stage of synchronization need not be initiated by mobile device 110 being synchronized in system 100.

In some embodiments, the synchronization between computing terminal 114 and server 112 may be used to back-up selected files or databases (e.g. a multimedia library) located on the computing terminal 114. For example, where computing terminal 114 is a home or work-based computer, a multimedia library located therein may be synchronized with server 112 in order to periodically back-up the files contained therein. As such, memory 120 of server 112 serves as a storage location for the files. The synchronization process may be initiated through input device 142 on computing terminal 114, or may be set for automatic synchronization based on a preselected schedule, such as at preselected time (s) during the day, week, month, etc.

In some embodiments, the initiation of either or both stages of synchronization as discussed above may be initiated at a respective input device, or based on other conditions such as after a set time interval. The initiation of synchronization may also be based on the detection of relevant events. For example, the second stage of synchronization between server 112 and mobile device 110 may be initiated upon detection of mobile device 110 being turned on, or on the availability of a particular communication link, such as a local WiFi link. As can be appreciated, the initiation of synchronization can be based on a wide range of conditions or events and such initiation scenarios are intended to be contemplated herein.

In some embodiments, computing terminal 114 can be a home or work-based computer comprising a file database (e.g. a multimedia library). A non-limiting example would be a database configured as a multimedia library containing music for use on the mobile device. Server 112 can be operated, for example, as part of a remote storage service by an entity other than the user(s) of mobile device 110 and computing terminal 114. Server 112 can therefore be situated at a location removed from that of computing terminal 114 and from the usual location of mobile device 110.

Figure 3:
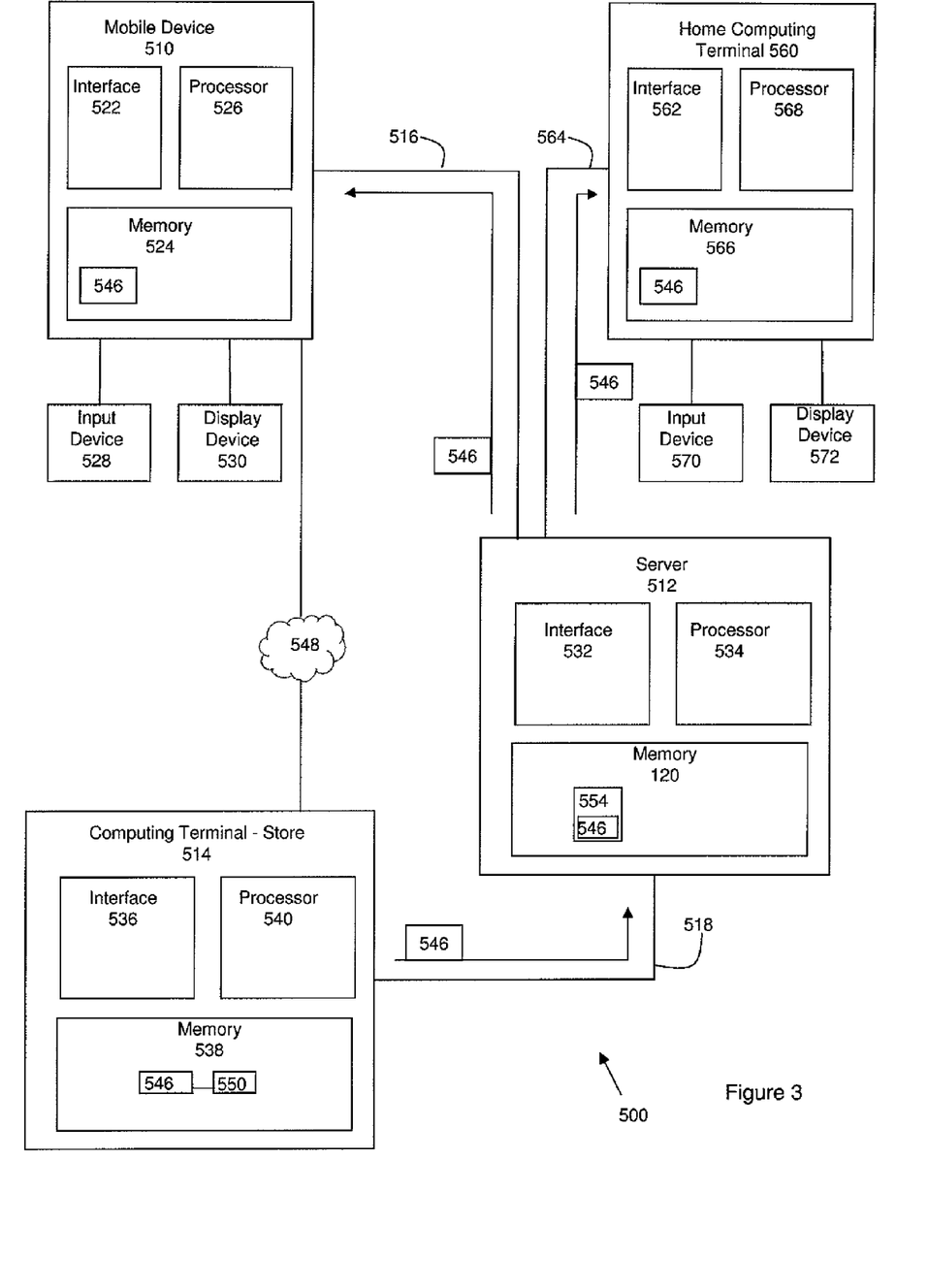
FIG. 3 depicts a system for synchronizing selected content of an on-line store and a selected end destination, according to a non-limiting embodiment.

In another embodiment, the computing terminal may be an on-line store that sells content (e.g. music files) for electronic distribution through the internet. FIG. 3 depicts an exemplary system 500 wherein the computing terminal is a third-party provider of electronic content. The system operates in largely the same manner as that described in reference to FIG. 1, with like elements having like numbers, however preceded by a "5" rather than a "1". For example, mobile device 510 is similar to mobile device 110, and server 112 is similar to server 512. In this embodiment, however, there is an additional communication device such as home computing terminal 560, which represents an alternate location with which the server 512 can synchronize and transfer the selected electronic content.

Home computing terminal 560 comprises a computing device suitable for managing data files. In one non-limiting example, home computing terminal 560 is a home-based personal computer. Home computing terminal 560 comprises an interface 562 which can be similar to interface 532. The interface 562 is generally compatible with link 564, which can be similar to the other links described herein. Home computing terminal 560 further comprises a memory 566 which can be similar to memory 120, as described above with respect to like elements in system 100. Home computing terminal 560 further comprises a processor 568 for managing data files.

Home computing terminal 560 can also be in communication with any suitable input device 570 which can be similar to input device 528, as described above with respect to like elements in system 100. Home computing terminal 560 can also be in communication with any suitable display device 572 which can be similar to display device 530, as described above with respect to like elements in system 100.

In system 500, computing terminal 514 is an online store offering for distribution a range of files (e.g. music files) for purchase. In this embodiment, files to be purchased can be selected using mobile device 510. In particular, files can be selected using a browser application provided on mobile device 510. On completion of file selection, the first stage of synchronization is initiated, that is the transfer of files 546 from online store 514 to file storage location 554 in memory 120 of server 512. As files 546 are being purchased, the initiation of synchronization is accompanied by an exchange of appropriate transactional information as known in the art. On approval/verification of the transactional information, the first stage of the synchronization system proceeds as generally described above in relation to system 100.

With file storage location 554 synchronized with the content selected from on-line store 514, server 512 is ready to synchronize with a suitable chosen destination for the selected content. In the embodiment depicted in FIG. 1, the destination is generally mobile device 110. In the system depicted in FIG. 3, while mobile device 510 can be selected as a chosen destination for synchronization with server 512, home computing terminal 560 can also be selected for synchronization with server 512. It will be appreciated that server 512 can be operated, for example, as part of a remote storage service by an entity other than the user(s) of mobile device 510 and computing terminal 514. Server 512 can therefore be situated at a location removed from that of computing terminal 514 and from the usual location of mobile device 510. In other embodiments, server 512 can be operated by the same entity as computing terminal 514, and can therefore be located, for example, on the same premises as computing terminal 514. In this way, selected content can be purchased with mobile device 510, and the content delivered to another location, such as home computing terminal 560. For example, home computing terminal 560 can be a home-based personal computer system having processor 568 and memory 566 enabled to receive and manage music files. More specifically, home computing terminal 560 may be enabled to receive and manage music files in a multimedia library contained therein.

With the use of identifier 550 and the implementation of an authenticated session through identifier verification, the purchased content is kept secure and restricted to the user in question. That is, content selected for synchronization between on-line store 514 and server 512 is restricted to only the user that purchased the content. The user may synchronize the server with one or more chosen destinations, but file 546 remains secure and accessible to only the user in question.

Figure 4:
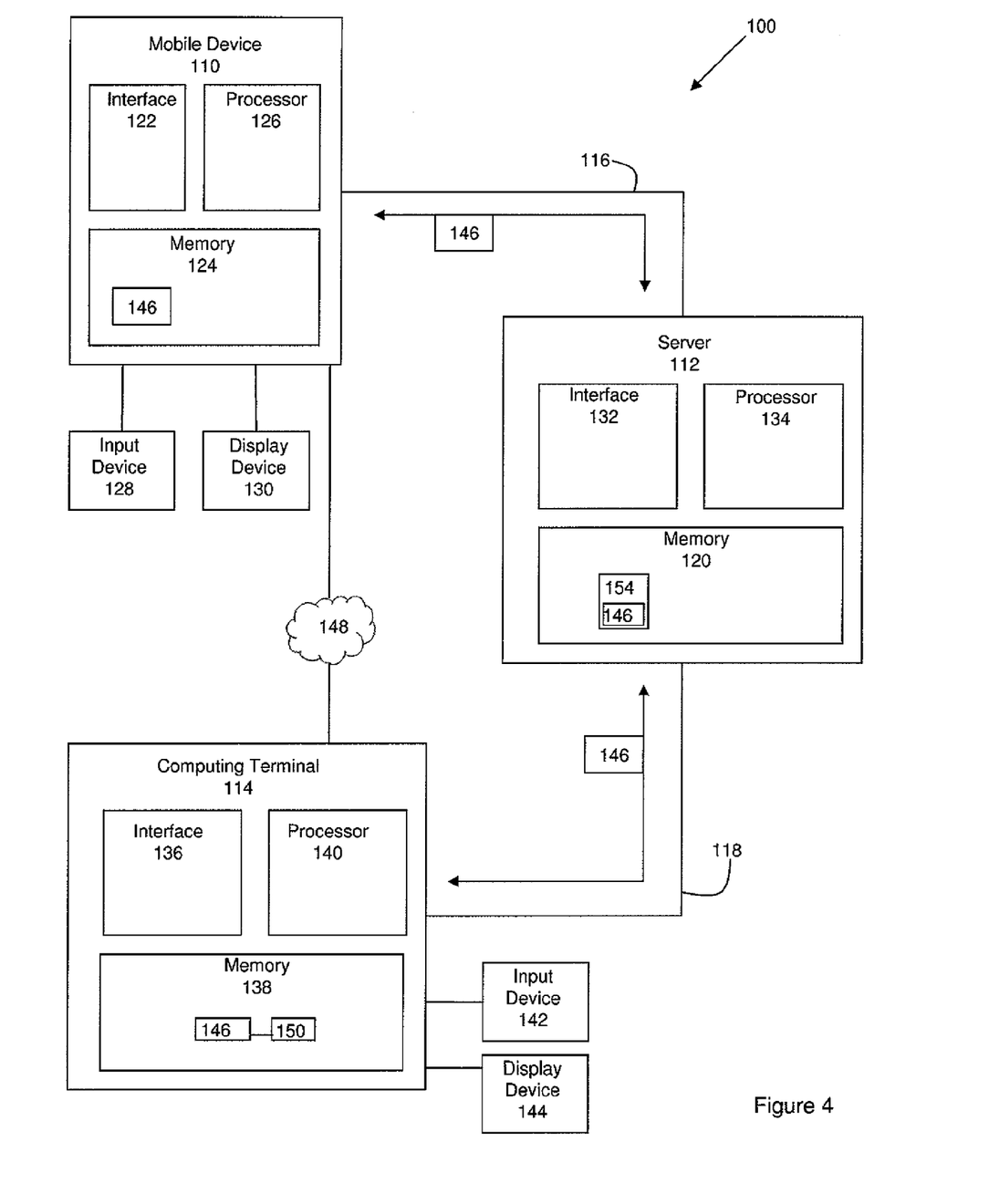
FIG. 4 depicts bi-directional synchronization between the mobile device and the computing terminal of FIG. 1, according to a non-limiting embodiment.
Figure 5:
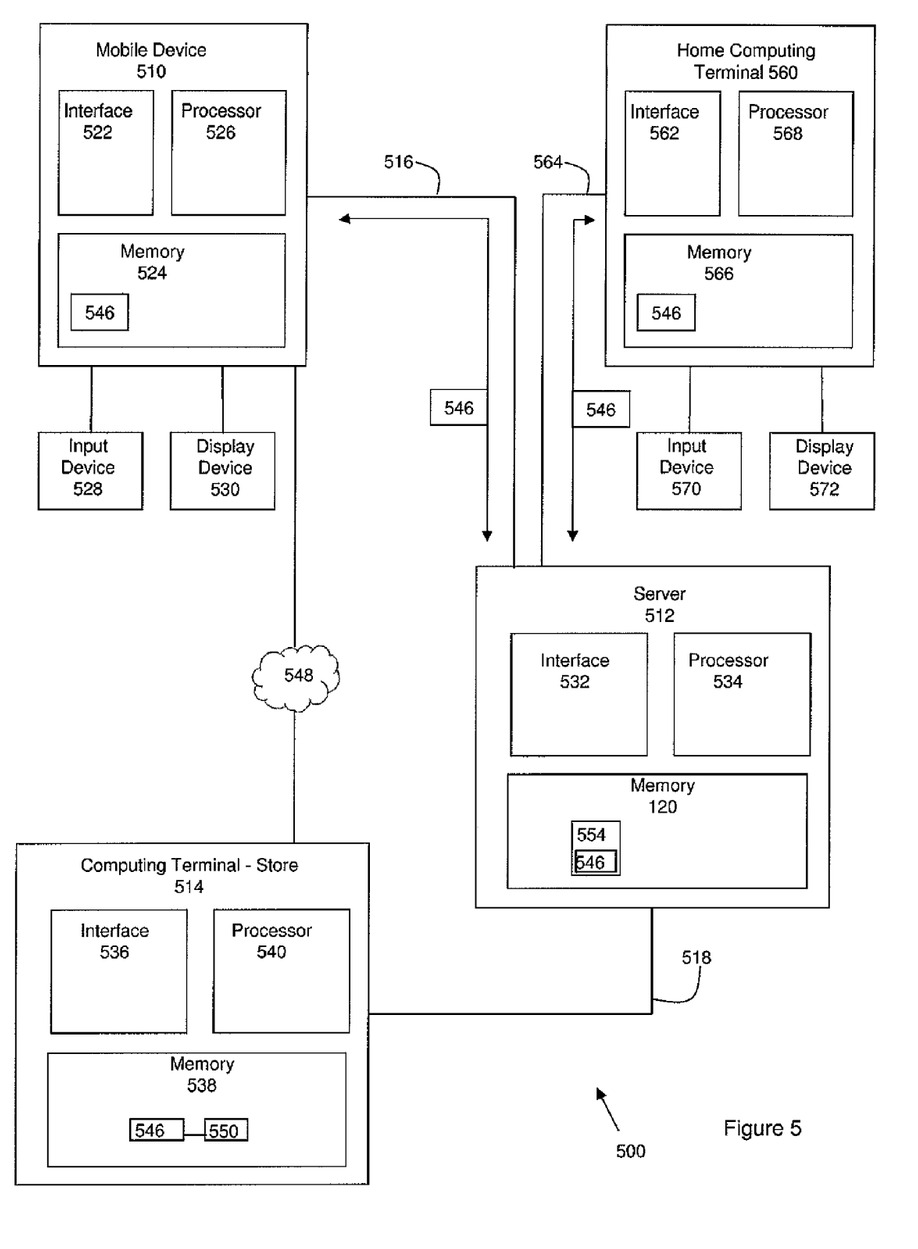
FIG. 5 depicts bi-directional synchronization between the mobile device or home computing terminal and the server of FIG. 3, according to a non-limiting embodiment.

While largely described within the framework of transferring data from computing terminal 114 to mobile device 110, system 100 can also be enabled for bi-directional synchronization wherein the contents of mobile device 110 are transferable to computing terminal 114 using the same methodology described above, albeit in a reversed direction (mobile device 110 to computing terminal 114). As depicted in FIG. 4, mobile device 110 and server 112 synchronize with the ability to transfer data in both directions between mobile device 110 and server 112. Similarly, server 112 and computing terminal 114 synchronize with the ability to transfer data in both directions between server 112 and computing terminal 114. As such, one of or a combination of server 112 and computing terminal 114 (e.g. a user's home-based computer) may serve as a backup storage location for content located on mobile device 110. System 500 can also be enabled for bi-directional synchronization wherein data are transferable in both directions between mobile device 510 or home computing terminal 560 and server 512, as depicted in FIG. 5. As changes occur on the user's mobile device 110, 510, or alternate home computing terminal 560, synchronization in the direction of server 112, 512 and in the case of system 100, computing terminal 114 serves to maintain associated file storage locations across the devices fully updated.

Figure 6:
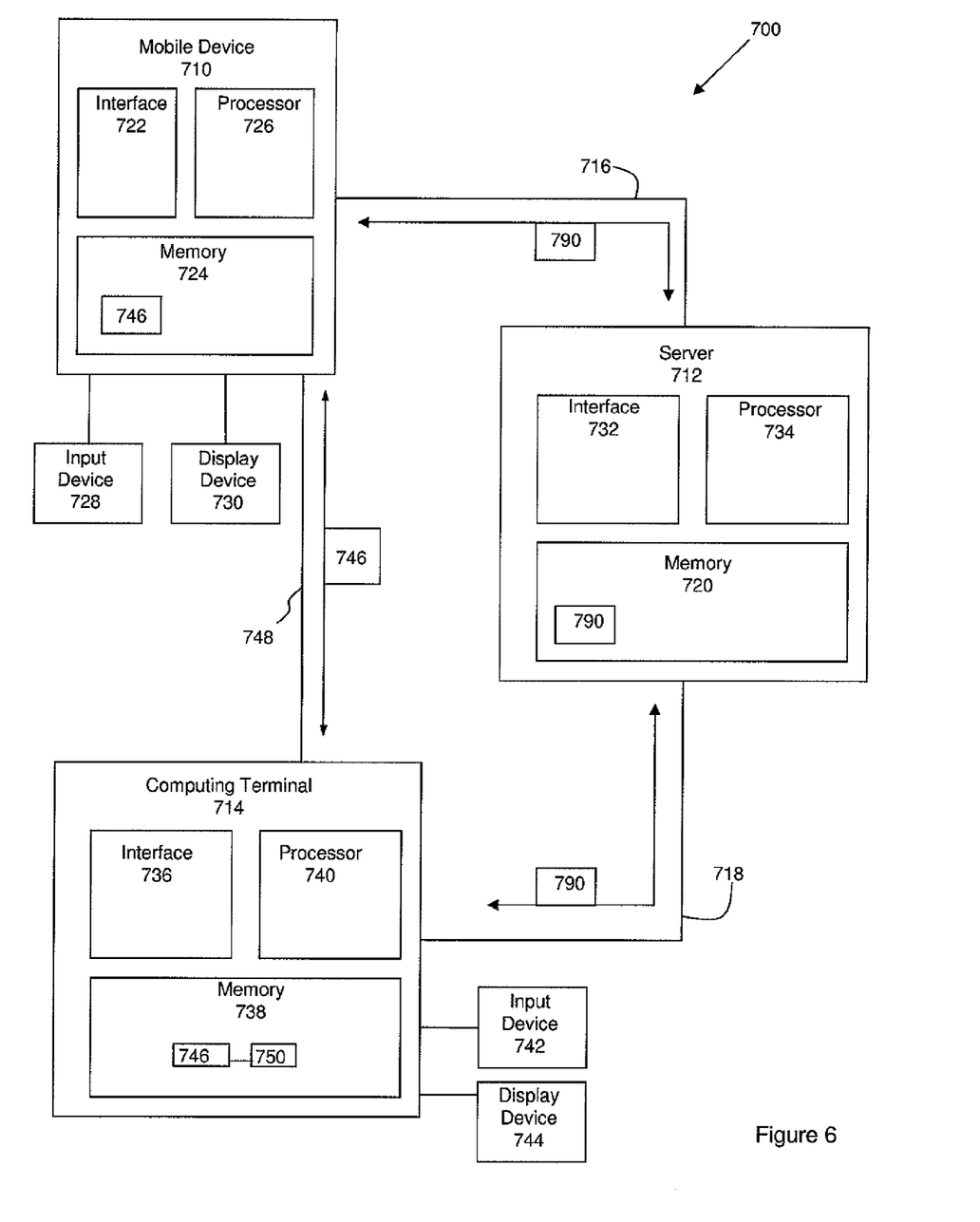
FIG. 6 depicts a system for synchronizing a mobile device and a computing terminal according to an alternate non-limiting embodiment.

In addition, while system 100, 500 is largely described with reference to the transfer of files through server 112, 512, in some embodiments, the server can serve as an intermediary for synchronization instructions, while file transfer occurs directly between the computing terminal and mobile device. An example of this arrangement is depicted in FIG. 6, with like elements having like numbers, however preceded by a "7" rather than a "1" (with reference to system 100). For example, mobile device 710 is similar to mobile device 110, and server 712 is similar to server 512. System 700 is useful where mobile device 710 and computing terminal 714 are likely to be periodically local to each other, and connectable through wired (e.g. USB cable) or wireless (e.g. WiFi) link. As shown, mobile device 710 and computing terminal 714 are connected through communication link 748. In this system, synchronization instructions 790 can be inputted, for example at input device 742 of computing terminal 714, with instructions 790 being sent through communication link 718 and queued in memory 720 of server 712. On detection of a particular predetermined event, such as the establishment of a communication link (e.g. USB) between mobile device 710 and computing terminal 714, for example link 748, server 712 can forward the synchronization instructions 790 to one of the mobile device 710 (through communication link 716) and computing terminal 714 (through communication link 718) to begin a direct file transfer on communication link 748. As will be appreciated, a reverse sequence of communications is also possible wherein the synchronization instructions 790 are inputted at mobile device 710, queued on server 712, and forwarded to computing terminal 714 upon detection of a predetermined event.

While the aforementioned systems have been largely described with reference to synchronization instructions that direct file transfers, the synchronization instructions need not be limited to file transfer. The synchronization instructions may relay information used for file management (e.g. meta-tag information, track information, etc.), such as for updating multi-media libraries. For example, having regard to system 700, synchronization instructions 790 entered at mobile device 710 may direct the creation or alteration to a playlist of tracks located in a multi-media library located in memory 738 of computing terminal 714. The synchronization instructions 790 inputted at mobile device 710 are communicated via link 716 to server 712 and placed in queue, with server 712 awaiting the detection of a predetermined event (e.g. the presence of computing terminal 114). As such, on detection of computing terminal 714, the synchronization instructions are communicated via link 718 to computing terminal 714, with the multi-media library located in computing terminal 714 being updated in accordance with the specific details of the synchronization instructions, in this case the creation or alteration of a playlist of tracks. As will be appreciated, a reverse sequence of communications is also possible wherein the synchronization instructions 790 are inputted at computing terminal 714, queued on server 712, and forwarded to mobile device 710. It will also be appreciated that the synchronization instructions that may be routed through the server need not be limited to file transfer and file management, but may comprise a variety of other commands that facilitate communication and synchronization between components of the system. It will be appreciated that server 712 can be operated, for example, as part of a remote storage service by an entity other than the user(s) of mobile device 710 and computing terminal 714. Server 712 can therefore be situated at a location removed from that of computing terminal 714 and from the usual location of mobile device 710.

Those skilled in the art will appreciate that in some embodiments the functionality of mobile devices 110, 510, 710, servers 112, 512, 712 and computing devices 114, 514, 560, 714 can be implemented using pre-programmed hardware or firmware elements (e.g., application specific integrated circuits (ASICs), electrically erasable programmable read-only memories (EEPROMs), etc.), or other related components. In other embodiments, the functionality of mobile devices 110, 510, 710, servers 112, 512, 712 and computing devices 114, 514, 560, 714 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

The invention claimed is:

1. A method in a mobile device comprising a communication interface and a memory, the method comprising:
    transmitting a first instruction from the communication interface to a first computing terminal hosting electronic content, the first instruction including an identifier of a file in the electronic content and a command to transmit the file from the first computing terminal to a server, for storage at the server pending further instruction;
    after transmitting the first instruction, transmitting a second instruction from the communication interface to the server, the second instruction including a command to transmit the file from the server to a second computing terminal for storage at the second computing terminal.

2. The method of claim 1, wherein the second instruction comprises an identifier associated with the file.

3. The method of claim 1, wherein transmitting the first instruction comprises transmitting the first instruction to the first computing terminal via the server.

4. A method in a server, the server comprising a memory and a communication interface, the method comprising:
    receiving a first instruction from mobile device at the communication interface, the first instruction including an identifier of a file and a command for causing a first computing terminal hosting electronic content including the file to transmit the file to the server for storage at the server pending further instruction;
    transmitting the first instruction from the communication interface to the first computing terminal;

in response to transmitting the first instruction, receiving the file at the communication interface from the first computing terminal;
storing the file in the memory in association with a first identifier;
receiving at the communication interface, from the mobile device, a second instruction including a second identifier and a command to transmit the file from the server to a second computing terminal for storage at the second computing terminal;
verifying that the second identifier matches the first identifier; and
after the verification, transmitting the file from the communication interface to the second computing terminal for storage at the second computing terminal.

5. The method of claim 4, further comprising:
prior to transmitting the file from the communication interface to the second computing terminal, verifying that the second computing terminal is turned on.

6. The method of claim 4, wherein the memory comprises a dedicated file storage location associated with the first identifier and wherein storing the file in the memory comprises storing the file in the dedicated file storage location.

7. The method of claim 1, wherein the second computing terminal is a home computing terminal associated with the mobile device.

8. The method of claim 1, further comprising:
after sending the second instruction, retrieving the file directly from the second computing terminal; and
storing the file in the memory.

9. The method of claim 1, wherein the second instruction includes an identifier of the second computing terminal.

10. The method of claim 4, further comprising:
in response to receiving the second instruction, retrieving an identifier of the second computing terminal from the memory and using the retrieved identifier in the transmitting of the file to the second computing terminal.

11. The method of claim 4, wherein the second instruction includes an identifier of the second computing terminal; the method comprising: using the received identifier in the transmitting of the file to the second computing terminal.

12. A mobile device, comprising:
a communication interface;
a memory; and
a processor interconnected with the communication interface and the memory, the processor configured to:
transmit a first instruction via the communication interface to a first computing terminal hosting electronic content, the first instruction including an identifier of a file in the electronic content and a command to transmit the file from the first computing terminal to a server, for storage at the server pending further instruction;
after transmitting the first instruction, transmit a second instruction via the communication interface to the server, the second instruction including a command to transmit the file from the server to a second computing terminal for storage at the second computing terminal.

13. The mobile device of claim 12, wherein the second instruction comprises an identifier associated with the file.

14. The mobile device of claim 12, the processor configured to transmit the first instruction to the first computing terminal via the server.

15. The mobile device of claim 12, wherein the second computing terminal is a home computing terminal associated with the mobile device.

16. The mobile device of claim 12, the processor further configured, after sending the second instruction, to retrieve the file directly from the second computing terminal and store the file in the memory.

17. The mobile device of claim 12, wherein the second instruction includes an identifier of the second computing terminal.

18. A server, comprising:
a communication interface;
a memory; and
a processor interconnected with the communication interface and the memory, the processor configured to:
receive a first instruction from a mobile device via the communication interface, the first instruction including an identifier of a file and a command for causing a first computing terminal hosting electronic content including the file to transmit the file to the server for storage at the server pending further instruction;
transmit the first instruction via the communication interface to the first computing terminal;
in response to transmitting the first instruction, receive the file via the communication interface from the first computing terminal;
store the file in the memory in association with a first identifier;
receive via the communication interface, from the mobile device, a second instruction including a second identifier and a command to transmit the file from the server to a second computing terminal for storage at the second computing terminal;
verify that the second identifier matches the first identifier; and
after the verification, transmit the file from the communication interface to the second computing terminal for storage at the second computing terminal.

19. The server of claim 18, the processor further configured, prior to transmitting the file to the second computing terminal, to verify that the second computing terminal is turned on.

20. The server of claim 18, wherein the memory comprises a dedicated file storage location associated with the first identifier; the processor configured to store the file in the dedicated file storage location.

21. The server of claim 18, the processor further configured, in response to receiving the second instruction, to retrieve an identifier of the second computing terminal from the memory and use the retrieved identifier to transmit the file to the second computing terminal.

22. The server of claim 18, wherein the second instruction includes an identifier of the second computing terminal; the processor configured to use the received identifier to transmit the file to the second computing terminal.

* * * * *